UNITED STATES PATENT OFFICE.

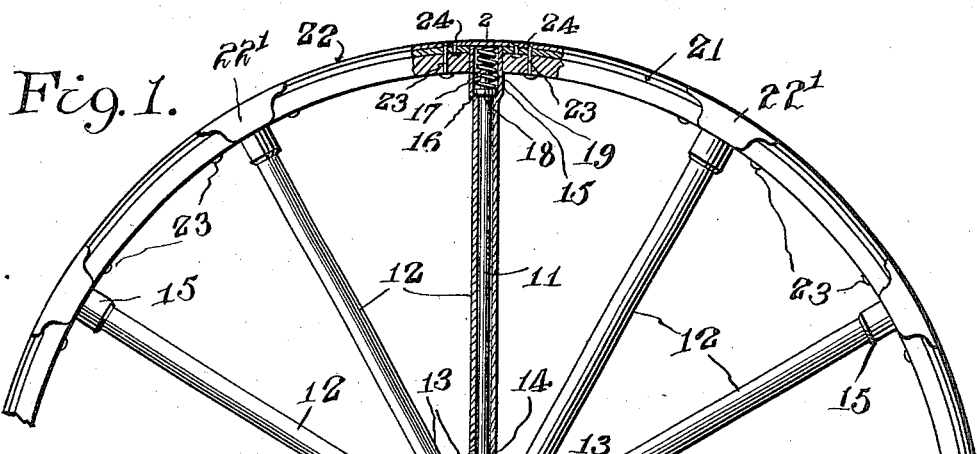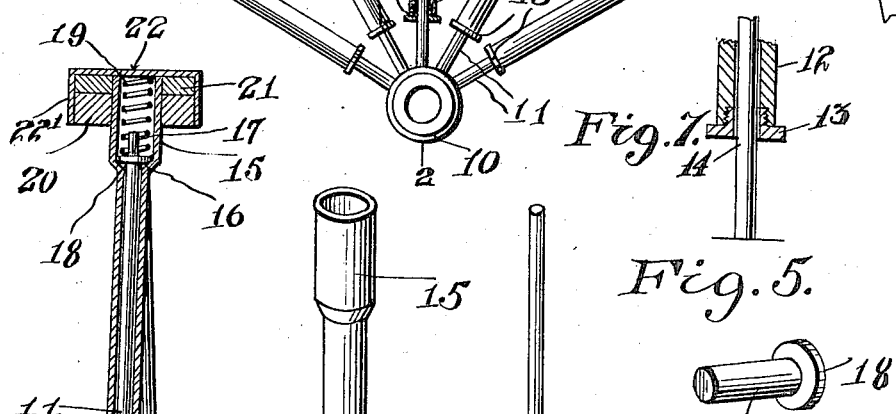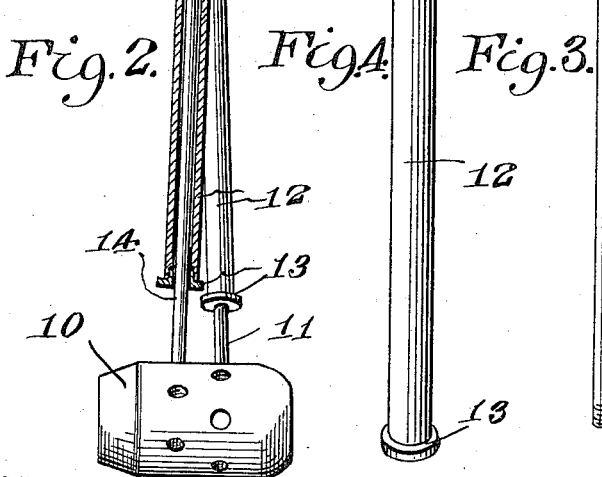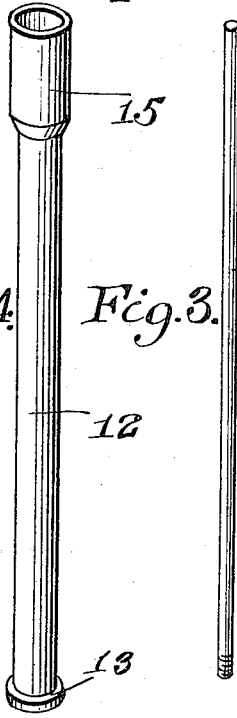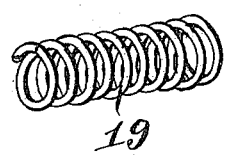

HOWARD W. LANG, OF LITCHFIELD, NEBRASKA.

SPRING-WHEEL.

1,059,882.   Specification of Letters Patent.   Patented Apr. 22, 1913.

Application filed June 3, 1912. Serial No. 701,382.

*To all whom it may concern:*

Be it known that I, HOWARD W. LANG, a citizen of the United States, residing at Litchfield, in the county of Sherman, State of Nebraska, have invented certain new and useful Improvements in Spring-Wheels; and I do hereby declare the following to be a full, clear, and exact description of the invention, such as will enable others skilled in the art to which it appertains to make and use the same.

This invention relates to spring wheels and has for an object to provide a wheel having a novel spring spoke which is composed of a small number of strong and simple parts.

A further object of the invention is to provide a spring wheel having a novel felly to which the outer ends of the spring spokes are secured.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a detail elevation, partly in section and disclosing all the features of my invention. Fig. 2 is a cross sectional view taken on the line 2—2 Fig. 1 with one of the spokes and the hub in elevation. Fig. 3 is a detail perspective view of the rod section of the spoke. Fig. 4 is a detail perspective view of the tubular section of the spoke. Fig. 5 is a detail perspective view of the spring securing pin. Fig. 6 is a detail perspective view of the spring. Fig. 7 is an enlarged detail view showing a section through the nipple nut.

Referring now to the drawing in which like characters of reference designate similar parts, 10 designates a metal hub to which the spokes are attached in staggered or zigzag relation to each other, as shown in Fig. 2. Each spoke consists of a rod 11 the inner end of which is threaded into or otherwise fixed to the hub. A tube 12 is slidably fitted on the outer end of the spoke, and carries at the inner end a gland nut 13 within which is confined a dust washer 14 which engages with the rod and prevents entry of foreign matter into the tube. The outer end of the tube is uniformly enlarged to form a tubular extension 15 with a resultant internal annular shoulder 16 at the juncture of the tube and extension. A pin 17 is confined within the extension and is formed with a disk head 18 which seats upon the shoulder 16. A helical spring 19 is seated upon the pin and bears with the inner end against the pin head, the spring being slightly greater in length than the extension and projecting with its outer end beyond the extension.

The felly consists of an annular inner member 20 formed preferably of wood and provided with suitable openings to receive the tubular extensions 15. An intermediate annular member 21 snugly encircles the inner member and is preferably formed of metal, suitable openings being formed in the member to snugly receive the tubular extensions 15, the latter being brazed or otherwise rigidly secured in the openings. An outer tread member or tire 22 formed preferably of steel encircles the intermediate member and forms an abutment for the springs of the spokes. The tire 22 has lateral flanges 22′ that extend straight out before application of the tire, the flanges being then bent downwardly to the position shown in Fig. 2 to secure the tire in position. The inner, intermediate, and outer members are fixedly secured together through the instrumentality of pins 23 passed through the members. Furthermore, the intermediate and tread members are secured together through the instrumentality of pins 24 passed through the members. It is now clear that the tubes 12 are fixed rigidly to the built up felly above described, and consequently move inwardly upon the rods 11 when the felly is compressed toward the hub during rotation of the wheel. This inward movement of the tubes upon the rods is resisted by the springs 19, the latter thus forming the elastic cushions that minimize shocks and jars and effect an elasticity between the felly and hub by means of which the wheel is made to ride as easy as a pneumatic wheel.

What is claimed, is:—

A spring wheel including a hub, a felly having spoke receiving openings therein, a tire closing said openings, and a plurality of spokes each comprising a rod fixed to said hub, a tube slidably fitted on said rod and having the outer end rigidly secured in the related opening in said felly, said tube having an internal annular stop shoulder, a pin carried in said tube having a head bearing upon said shoulder, and a spring seated upon said pin within said tube and having one end bearing upon the pin head and the opposite end bearing upon said tire.

In testimony whereof, I affix my signature, in presence of two witnesses.

HOWARD W. LANG.

Witnesses:
H. D. LANG,
J. L. GOFF.

Copies of this patent may be obtained for five cents each, by addressing the "Commissioner of Patents, Washington, D. C."